United States Patent
Unuma et al.

(10) Patent No.: US 11,397,655 B2
(45) Date of Patent: Jul. 26, 2022

(54) ABNORMALITY DIAGNOSIS SYSTEM THAT RECONFIGURES A DIAGNOSTIC PROGRAM BASED ON AN OPTIMAL DIAGNOSIS PROCEDURE FOUND BY COMPARING A PLURALITY OF DIAGNOSIS PROCEDURES

(71) Applicant: Hitachi, Ltd., Tokyo (JP)

(72) Inventors: Munetoshi Unuma, Tokyo (JP); Junsuke Fujiwara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 485 days.

(21) Appl. No.: 16/476,123

(22) PCT Filed: Feb. 24, 2017

(86) PCT No.: PCT/JP2017/007080
§ 371 (c)(1),
(2) Date: Jul. 5, 2019

(87) PCT Pub. No.: WO2018/154703
PCT Pub. Date: Aug. 30, 2018

(65) Prior Publication Data
US 2019/0354456 A1    Nov. 21, 2019

(51) Int. Cl.
*G06F 11/30*      (2006.01)
*G06F 11/273*    (2006.01)
(Continued)

(52) U.S. Cl.
CPC .......... *G06F 11/273* (2013.01); *G06F 16/245* (2019.01); *G05B 23/0294* (2013.01); *G06F 11/3089* (2013.01); *G06F 11/3452* (2013.01)

(58) Field of Classification Search
CPC ...... G06F 11/273; G06F 16/245; G06F 30/34; G06F 30/343; G06F 30/347;
(Continued)

(56) References Cited

U.S. PATENT DOCUMENTS 5,764,954 A * 6/1998 Fuller ..................... G06F 30/34
716/121
6,530,049 B1 * 3/2003 Abramovici ... G01R 31/318519
714/725
(Continued)

FOREIGN PATENT DOCUMENTS

| CN | 101652754 A | 2/2010 |
|---|---|---|
| JP | 2007-257190 A | 10/2007 |

(Continued)

OTHER PUBLICATIONS

Chinese Office Action received in corresponding Chinese Application No. 201780082562.7 dated Aug. 4, 2021.
(Continued)

*Primary Examiner* — Joseph O Schell
(74) *Attorney, Agent, or Firm* — Mattingly & Malur, PC (57) ABSTRACT

The abnormality diagnosis system detects a failure sign of a device to be diagnosed. The abnormality diagnosis system includes: a diagnosis process search unit which searches for a suitable diagnosis processing procedure by comparing a plurality of diagnosis processing procedures, and outputs reconfiguration information corresponding to the suitable diagnosis processing procedure; and a diagnosis processing unit which has a reconfigurable processing unit and which uses the suitable diagnosis processing procedure found by the diagnosis process search unit to detect a failure sign of the device to be diagnosed by reconfiguring the processing unit on the basis of the reconfiguration information.

4 Claims, 6 Drawing Sheets

(51) Int. Cl.
  *G06F 16/245* (2019.01)
  *G06F 11/34* (2006.01)
  *G05B 23/02* (2006.01)

(58) Field of Classification Search
  CPC ............. G06F 15/7867; G06F 15/7871; G06F 15/7882; G06F 15/7885; G06F 15/7889; G06F 15/7892; G06F 11/3089; G06F 11/3447; G06F 11/3452; G06F 11/22; G06F 11/2205; G06F 11/2289; G06F 11/2294; G06F 11/27; G01R 31/31705; G05B 23/0208; G05B 23/021; G05B 23/0213; G05B 23/0218; G05B 23/0224; G05B 23/0227; G05B 23/024; G05B 23/0259; G05B 23/0286; G05B 23/0289; G05B 23/0294; G05B 23/0297
  See application file for complete search history.

(56) References Cited

U.S. PATENT DOCUMENTS

| | | | | |
|---|---|---|---|---|
| 6,567,834 B1* | 5/2003 | Marshall | ............... | G06F 7/527 |
| | | | | 708/626 |
| 7,577,726 B1* | 8/2009 | Conard | ............... | G06F 8/654 |
| | | | | 709/221 |
| 10,073,115 B1* | 9/2018 | Tokars | ............... | G01P 21/00 |
| 2004/0027118 A1* | 2/2004 | Lenz | ............... | G01D 3/036 |
| | | | | 324/207.26 |
| 2004/0167686 A1* | 8/2004 | Baker | ............... | B61L 5/06 |
| | | | | 701/19 |
| 2010/0023307 A1* | 1/2010 | Lee | ............... | G06K 9/6226 |
| | | | | 703/7 |
| 2010/0100521 A1 | 4/2010 | Fujimaki et al. | | |
| 2012/0053901 A1* | 3/2012 | Arefeen | ............... | G05B 23/0213 |
| | | | | 702/183 |
| 2013/0297256 A1* | 11/2013 | Yang | ............... | G01M 13/028 |
| | | | | 702/183 |
| 2014/0188329 A1* | 7/2014 | Chen | ............... | G07C 5/008 |
| | | | | 701/29.6 |
| 2014/0195184 A1* | 7/2014 | Maeda | ............... | G01M 99/00 |
| | | | | 702/183 |
| 2014/0233743 A1* | 8/2014 | Hillbratt | ............... | G06F 11/22 |
| | | | | 381/60 |
| 2016/0323143 A1* | 11/2016 | Kim | ............... | G06F 3/0629 |

FOREIGN PATENT DOCUMENTS

| | | | | |
|---|---|---|---|---|
| JP | 4622177 B2 * | 2/2011 | ............ | G06F 21/335 |
| JP | 2015-018389 A | 1/2015 | | |
| JP | 2015-203936 A | 11/2015 | | |

OTHER PUBLICATIONS

International Search Report of PCT/JP2017/007080 dated May 16, 2017.

* cited by examiner

ABNORMALITY DIAGNOSIS SYSTEM THAT RECONFIGURES A DIAGNOSTIC PROGRAM BASED ON AN OPTIMAL DIAGNOSIS PROCEDURE FOUND BY COMPARING A PLURALITY OF DIAGNOSIS PROCEDURES

TECHNICAL FIELD

The present invention relates to an abnormality diagnosis system of a machine equipped with a driving part and an abnormality diagnosis method.

BACKGROUND ART

As a related art of this technical field, there is PTL 1. For example, the specification of the document of the related art discloses "an abnormality diagnosis device includes a sensor data acquisition unit which acquires multi-dimensional sensor data measured by a plurality of sensors provided in a machine facility, a data mining unit which determines an abnormality on the basis of an abnormality degree indicating a degree of separation between diagnosis target data and a normal model which is generated by learning through the sensor data when the machine facility operates normally, and a remote monitoring unit which diagnoses an abnormality on the basis of whether each piece of sensor data falls within a predetermined range. The data mining unit performs the learning in an initialization mode to reconfigure the normal model according to a command from an initialization command unit when the state of the outside environment is significantly changed."

CITATION LIST

Patent Literature

PTL 1: JP 2015-18389 A

SUMMARY OF INVENTION

Technical Problem

PTL 1 discloses a method of diagnosing an abnormality of a machine facility on the basis of a degree of separation from a normal model. In addition, there is also disclosed a method of reconfiguring the normal model according to a change in the outside environment.

However, a processing content of the diagnosis device is fixed. In a case where a diagnosis target or a diagnosis sensor is changed, there is a need to modify the diagnosis device in accordance with a new diagnosis target or a new diagnosis sensor.

In addition, there is no description about the change of a diagnosis algorithm. In a case where a new diagnosis algorithm is developed, there is no way to compare a priority with respect to the algorithm used so far.

Solution to Problem

In order to solve the above problem, there is provided an abnormality diagnosis system according to the present invention. The abnormality diagnosis system which detects a failure sign of a diagnosis target machine includes a diagnosis processing search unit which compares a plurality of diagnosis processing procedures to search an optimal diagnosis processing procedure, and outputs reconfiguration information corresponding to the optimal diagnosis processing procedure, and a diagnosis processing unit which includes a reconfigurable processing unit, and reconfigures the processing unit on the basis of the reconfiguration information to detect a failure sign of the diagnosis target machine using the optimal diagnosis processing procedure searched by the diagnosis processing search unit.

Advantageous Effects of Invention

According to the present invention, a diagnosis processing unit can be reconfigured with ease. Therefore, even in a case where a diagnosis target machine or a diagnosis target item is changed, a failure sign can be easily and speedy detected in a diagnosis processing procedure which is applied to a changed diagnosis target.

DESCRIPTION OF EMBODIMENTS

Hereinafter, embodiments of the present invention will be described using the drawings.

Figure 1:
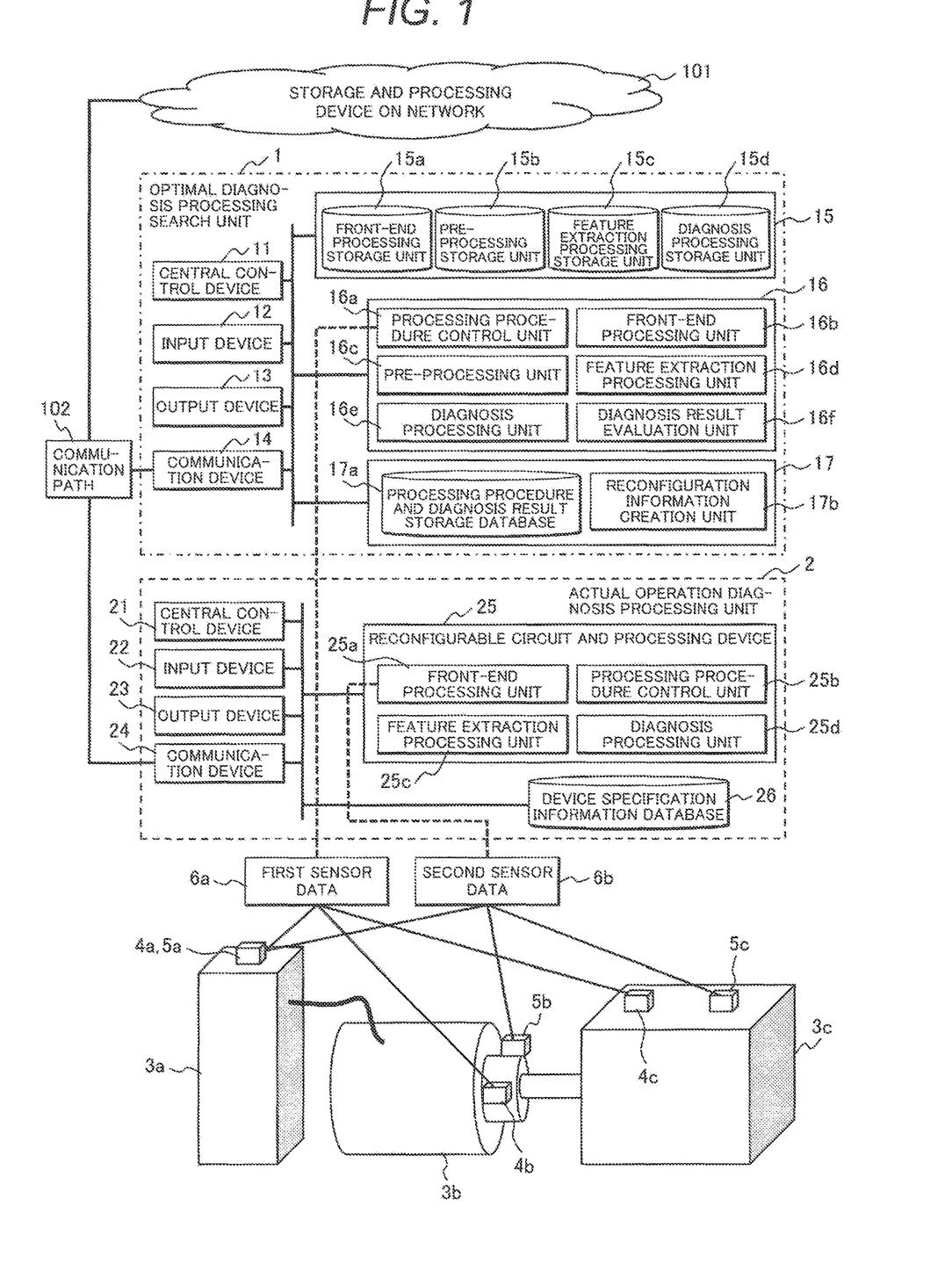
FIG. 1 is a diagram illustrating a configuration of an abnormality diagnosis system of an embodiment.

FIG. 1 is a diagram illustrating a configuration of an abnormality diagnosis system 100 of an embodiment. The abnormality diagnosis system 100 is used for detecting a failure sign of a diagnosis target machine and, as described herein, is configured by an optimal diagnosis processing search unit 1 (also referred to as "diagnosis processing search unit") to search an optimal diagnosis processing procedure, an actual operation diagnosis processing unit 2 (also referred to as "diagnosis processing unit") to actually detect the failure sign of the diagnosis target machine, a storage and processing device 101 on a network, and a communication path 102 to connect these components. Further, in the following, the description will be given on an assumption of a system which includes the storage and processing device 101 on the network, but the device may be omitted. Further, the expression "optimal diagnosis processing" hereinbelow does not mean an "optimal diagnosis processing" with all conditions taken into consideration, but refers to an "optimal diagnosis processing" that can be confirmed under limited conditions, so to speak, "preferable diagnosis processing".

In FIG. 1, a diagnosis target of the abnormality diagnosis system 100 is an air compression device 3 which consists of a power source 3a, a rotary machine 3b, and an air compressor main body 3c. In the power source 3a, current sensors 4a and 5a are attached to measure currents of corresponding positions. In the rotary machine 3b, acceleration sensors 4b and 5b are attached. In the air compressor main body 3c, acceleration sensors 4c and 5c are attached. Further, in the following, sensor data obtained by the current sensor 4a and the acceleration sensors 4b and 4c will be called first sensor data 6a, and the sensor data obtained by the current sensor 5a and the acceleration sensors 5b and 5c will be called second sensor data 6b.

Among these, the first sensor data 6a is input to the optimal diagnosis processing search unit 1, and the second sensor data 6b is input to the actual operation diagnosis processing unit 2. In FIG. 1, the acceleration sensors are provided separately to be dedicated to the optimal diagnosis processing search unit 1 and the actual operation diagnosis processing unit 2, and one current sensor is used commonly, but the application of the present invention is not limited thereto.

In a case where a measurement range of the diagnosis target is unknown, the sensors are provided individually like the acceleration sensors of FIG. 1, sensors which are expensive even though a detection bandwidth and a measurement range both are wide are desirably used as the sensors (4a, 4b, and 4c) dedicated to the optimal diagnosis processing search unit 1, and sensors which are inexpensive even though the detection bandwidth and the measurement range both are narrow are desirably used as the sensors (5a, 5b, and 5c) dedicated to the actual operation diagnosis processing unit 2. This is because, if the bandwidth and the measurement range necessary for the abnormality diagnosis can be specified using the sensor dedicated to the optimal diagnosis processing search unit 1, an appropriate abnormality diagnosis in the actual operation diagnosis processing unit 2 can be realized at a cheap price by selecting the sensor dedicated to the actual operation diagnosis processing unit 2 which satisfies the range and inexpensive.

On the other hand, in a case where the measurement range of the diagnosis target is known, the optimal diagnosis processing search unit 1 and the actual operation diagnosis processing unit 2 are configured to share one sensor like the current sensor of FIG. 1, and the detection bandwidth and the measurement range may be realized using the sensors which are narrow in range but inexpensive.

The optimal diagnosis processing search unit 1 is a unit to search an optimal diagnosis processing procedure and an algorithm and, as illustrated in FIG. 1, consists of a central control device 11, an input device 12, an output device 13, a communication device 14, a signal processing group storage unit 15, a signal processing execution unit 16, and an actual operation processing reconfiguration unit 17. These components may be realized using a personal computer, or may be manufactured as a dedicated device. In addition, as described below, some or all of the processing procedure and the algorithm may be configured using a reconfigurable electronic circuit or a CPU.

In addition, the actual operation diagnosis processing unit 2 is a processing unit which realizes all or some of the optimal processing procedure and the algorithm searched by the optimal diagnosis processing search unit 1 using the reconfigurable electronic circuit and the CPU, and as illustrated in FIG. 1, consists of a central control device 21, an input device 22, an output device 23, a communication device 24, a reconfigurable circuit and processing device 25, and a device specification information database 26.

Figure 3:
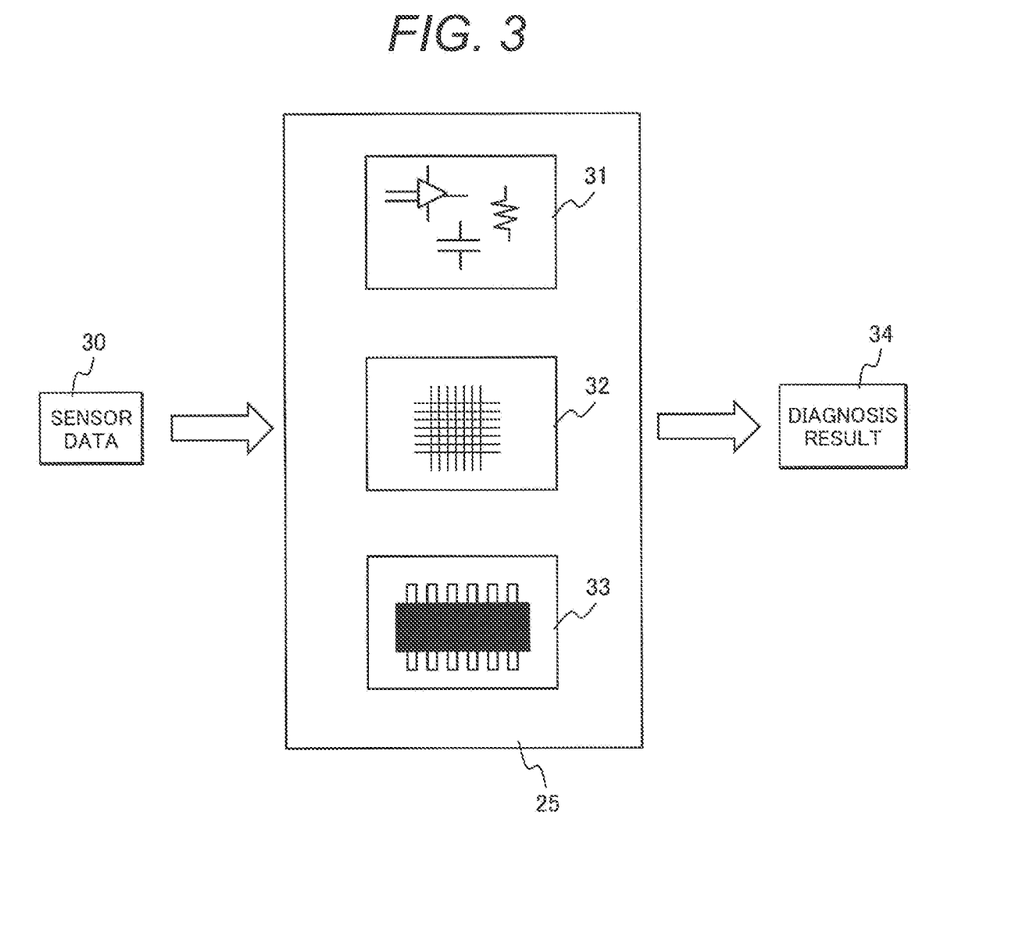
FIG. 3 is a diagram illustrating an outline of a reconfigurable circuit.

Herein, the outline of the reconfigurable circuit and processing device 25 is illustrated in FIG. 3. As illustrated in the drawing, the reconfigurable circuit and processing device 25 processes the sensor data 30 obtained from the sensors for the actual operation diagnosis processing unit 2 such as the current sensor 5a and the acceleration sensors 5b and 5c to output a diagnosis result 34, and is configured by a reconfigurable analog circuit 31, a reconfigurable digital circuit 32, and a programmable CPU 33. These components may be connected in an arbitrary order. For example, first, the sensor data 30 is processed by the reconfigurable analog circuit 31, the output of the reconfigurable analog circuit 31 is processed by the reconfigurable digital circuit 32, and the output of the reconfigurable digital circuit 32 is processed by the programmable CPU 33, so that the diagnosis result 34 may be obtained.

Further, the reconfigurable analog circuit 31 is a circuit which can be reconfigured in an analog circuit which has various functions by switching circuit connections of operational amplifiers, resistors, and capacitors therein using switch circuits, and also called a programmable system-on-chip. With the change of the circuit connection in the reconfigurable analog circuit 31, the analog sensor data can be appropriately subjected to an analog signal processing such as a filtering and an average/effective value processing in an analog region.

In addition, a field-programmable gate array (FPGA) is an example of the reconfigurable digital circuit 32. Even in the reconfigurable digital circuit 32, various types of digital signal processing can be realized by reconfiguring inner logic circuits.

In addition, with the use of the programmable CPU 33, it is possible to realize a reconfigurable device which performs various type of signal processing where an analog region and a digital region are mixed.

The device specification information database 26 of the actual operation diagnosis processing unit 2 illustrated in FIG. 1 stores the specification of the actual operation diagnosis processing unit 2 and specification information of the connected sensors (the current sensor 5a and the acceleration sensors 5b and 5c), and is used in a case where the optimal diagnosis processing search unit 1 creates reconfiguration command information, or in a case where a sensor to be connected to the actual operation diagnosis processing unit 2 is selected. Further, the device specification information database 26 is not necessarily disposed in the actual operation diagnosis processing unit 2, but may be disposed in the optimal diagnosis processing search unit 1, or may be disposed in the storage and processing device 101 on the network. The specification of the sensor may be stored in the sensor itself.

Next, the configurations of the optimal diagnosis processing search unit 1 and the actual operation diagnosis processing unit 2 will be described in more detail.

As illustrated in FIG. 1, the optimal diagnosis processing search unit 1 is configured by the signal processing group storage unit 15 where various signal processing schemes are stored, the signal processing execution unit 16 which performs various types of signal processing, and the actual operation processing reconfiguration unit 17 which is used to create reconfiguration information for the actual operation diagnosis processing unit 2.

The signal processing group storage unit 15 is configured by a front-end processing storage unit 15a, a pre-processing storage unit 15b, a feature extraction processing storage unit 15c, and a diagnosis processing storage unit 15d, and stores a processing algorithm in each processing block. Each processing block prepares a processing block which can be executed in each of the analog region (also including simulation) and the digital region in consideration of an analog/digital mixing process in the actual operation diagnosis processing unit 2.

The signal processing execution unit 16 is a unit which performs the processing algorithm stored in the signal processing group storage unit 15, and particularly is configured by a processing procedure control unit 16a, a front-end processing unit 16b, a pre-processing unit 16c, a feature extraction processing unit 16d, a diagnosis processing unit 16e, and a diagnosis result evaluation unit 16f.

The actual operation processing reconfiguration unit 17 is configured by a processing procedure and diagnosis result storage database 17a and a reconfiguration information creation unit 17b. In the processing procedure and diagnosis result storage database 17a, a plurality of execution results of the signal processing execution unit 16 are stored. The reconfiguration information creation unit 17b generates the reconfiguration information of the actual operation diagnosis processing unit 2. The diagnosis result evaluation unit 16f selects an execution result which is evaluated as an optimal diagnosis processing procedure from among the plurality of execution results stored in the processing procedure and diagnosis result storage database 17a, and generates the reconfiguration information of the actual operation diagnosis processing unit 2 using the reconfiguration information creation unit 17b. The actual operation diagnosis processing unit 2 reconfigures the reconfigurable analog circuit 31, the reconfigurable digital circuit 32, and the programmable CPU 33 in the reconfigurable circuit and processing device 25 on the basis of the generated reconfiguration information.

Next, the processing procedure of the abnormality diagnosis system 100 of this embodiment consisting of the above configuration will be described using the flowchart of FIG. 2.

If the search of the optimal diagnosis processing starts (S1), first, the processes of the optimal diagnosis processing search unit 1 are performed (S2 to S13), and the processes of the actual operation diagnosis processing unit 2 are performed (S14 to S25).

In the optimal diagnosis processing search unit 1, at the beginning, the first sensor data 6a is acquired (S2), and the processes of a plurality of processing algorithms are performed for each block with respect to the input value in an order of a front-end processing S3, a pre-processing S4, a feature extraction processing S5, and a diagnosis processing S6.

Figure 4:
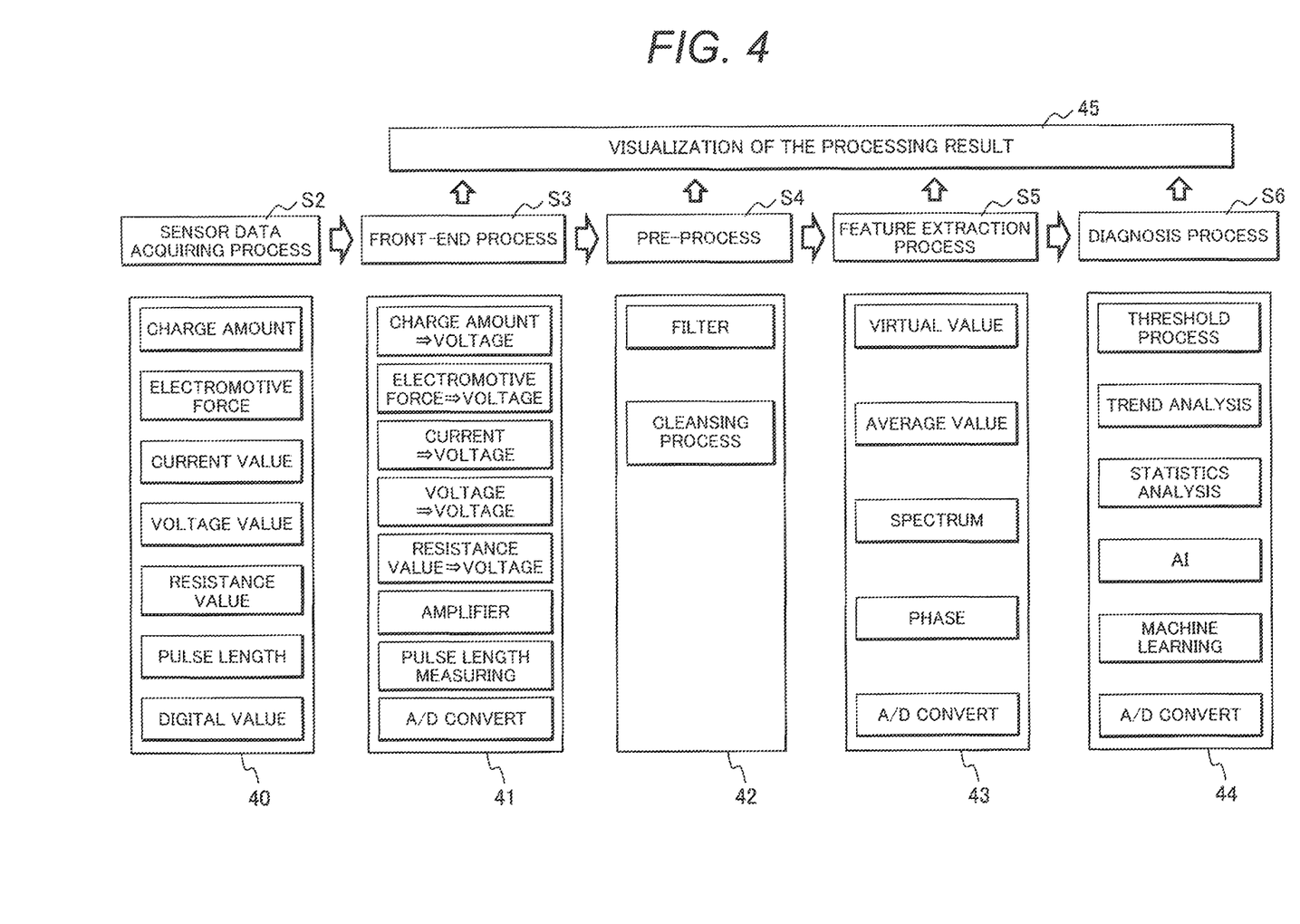
FIG. 4 is processing contents of the processes of FIG. 2.

The details of processing contents of the optimal diagnosis processing search unit 1 which are performed in S2 to S6 are illustrated in FIG. 4. Further, the processing algorithms each are accumulated in the signal processing group storage unit 15.

In a first sensor data acquisition processing S2, the first sensor data 6a is acquired. As illustrated in a processing block 40, data herein is acquired from various types of sensors. For example, there are various types of sensors such as a sensor of which the charge amount changes according to the magnitude of acceleration, a sensor of which the electromotive force is changed like a thermocouple, an analog output sensor of which the current value, voltage value, or resistance changes, a sensor which performs A/D conversion and outputs a digital value, and a digital output sensor which outputs with a pulse length.

In a case where the first sensor data 6a is an analog output, the front-end processing S3 converts the first sensor data into a voltage value which can be uniformly processed in the analog region as illustrated in a processing block 41. In a case where the first sensor data 6a is a digital output expressed by a pulse width, the front-end processing is a process of collecting the digital value. In order to handle a plurality of conversion processes, a processing module is created for each conversion process and, as needed, an evaluator may pick up these modules to realize an optimal conversion process. Further, a desired circuit may be reconfigurable using the reconfigurable analog circuit or the digital circuit as illustrated in FIG. 3.

As illustrated in a processing block 42, in the pre-processing S4, a filtering process or a cleansing process of the data collected in the front-end processing S3 is performed, a signal component or data unnecessary in the signal processing is excluded.

The feature extraction processing S5 is a process of extracting a feature effective to the extraction of a machine abnormality. In FIG. 4, as illustrated in a processing block 43, an effective value processing, an average value processing, a spectrum intensity, and a phase are prepared, but a feature data conversion algorithm may be used for the conversion to a feature.

The diagnosis processing S6 performs an abnormality diagnosis processing on the basis of the feature necessary for the diagnosis which is extracted in the feature extraction processing S5. In FIG. 4, as illustrated in a processing block 44, as a specific method of the abnormality diagnosis, there are prepared a threshold processing, a trend analysis, a statistics analysis, a method of using AI, and a method of using machine learning. The diagnosis processing may be performed using the diagnosis algorithm.

Further, as illustrated in FIG. 4, an A/D conversion process is prepared in the processing blocks 41, 43, and 44. This is because the processing after the front-end processing S3, the feature extraction processing S5, and the diagnosis processing S6 can be transferred from the analog signal processing region to the digital signal processing region. For example, in a case where the A/D conversion is performed at the end of the feature extraction processing S5, the analog processing is performed up to the feature extraction processing S5, and the digital processing is performed after the diagnosis processing S6, so that the signal processing method of the FPGA or the CPU may be used in the diagnosis processing S6.

In addition, a visualization 45 of the processing result of each processing may be performed. In the visualization 45 of the processing result, drawing data is created on the basis of the processing result, and the drawing data is displayed in the output device 13 of the optimal diagnosis processing search unit 1.

Next, an example of the diagnosis processing procedure in the optimal diagnosis processing search unit 1 in the abnormality diagnosis system 100 of this embodiment using the charge-output acceleration sensor will be described using FIG. 5.

As described herein, first, the charge amount of a charge-output acceleration sensor 50 is acquired in the sensor data acquisition processing S2, a process 51 of converting the charge amount to a voltage value is performed in the front-end processing S3. In a case where the converted voltage value is low, the value is amplified using an amplifier 52 (a parameter of the amplification value is also a select item of the diagnosis result evaluation unit described below).

Figure 5:
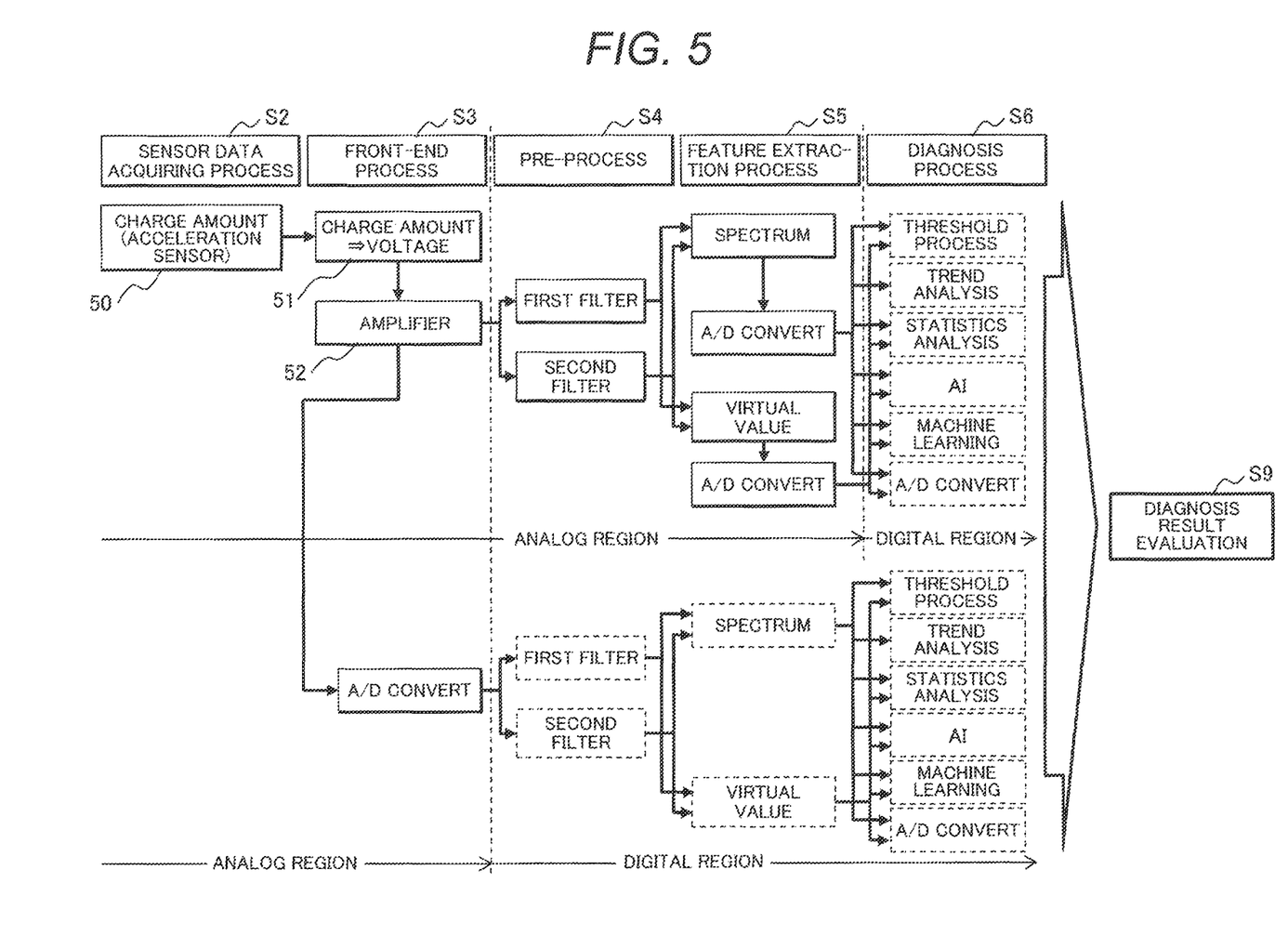
FIG. 5 is a diagram illustrating a prepared diagnosis processing procedure.

After the amplification of the amplifier 52, the processing block on the upper side of FIG. 5 where the pre-processing S4 and the feature extraction processing S5 are performed in the analog region, and the processing block on the lower side of FIG. 5 where the these processes are performed in the digital region can be divided and processed.

Such division is made because the flexibility of the analog signal processing is low compared to the digital signal processing (the flexibility of selecting elements such as a capacitor and the limitation due to the characteristic of an operational amplifier), and there may be a difference in the diagnosis result due to the limitations. In addition, the analog signal processing can be performed in real time, but the digital signal processing may cause a difference in the diagnosis processing result due to a processing performance of the CPU. For such reasons, in FIG. 5, the processes S4 to S6 are displayed separately. Of course, the processing procedure may be displayed without separation, the priority of the analogy and digital processing may be determined by an internal process so as to output the preferable processing as the diagnosis result.

In this embodiment, the processing items after the pre-processing S4 are the same in the analog and digital signal processing regions, and thus the redundant description will be omitted in the following description.

In the pre-processing S4, there are prepared two types of filters (a first filter and a second filter), and these filters are configured to be selected and used. Further, the filter used herein is well known in the related art, and thus the detailed description thereof will be omitted.

In the feature extraction processing S5, there are prepared a feature extraction from a spectrum analysis (in the case of the digital signal processing, the FFT, and in the case of the analog signal processing, a number of BPFs are disposed, and the effective values thereof are output), and a feature extraction from the effective value of an input waveform. These extractions can be selected and used.

In the diagnosis processing S6, there are prepared the diagnosis algorithms such as the threshold processing and the trend analysis as illustrated in the drawing where the feature extracted in the feature extraction processing S5 is evaluated. These algorithms can be selected and used.

The diagnosis processing procedure performed by the optimal diagnosis processing search unit 1 may be set by the processing procedure control unit 16a of the optimal diagnosis processing search unit 1. The diagnosis processing procedure may be manually set by an operator. In the former case, the diagnosis processing procedure may be comprehensively set with respect to all the combinations. In addition, in the latter case, for example, the operator may interactively select a desired diagnosis processing procedure using a screen image editor displayed in the output device 13 such as a liquid crystal display. Alternatively, the diagnosis processing procedure created in the past is displayed, and the procedure may be used as it is, or may be partially modified and used. Further, in a case where there is a process which is not possible to be performed by the actual operation diagnosis processing unit 2 in consideration of the specification information obtained from the device specification information database 26, the processing content which is selectable in each process may be limited, or a suggestion may be displayed.

In addition, in a case where a new process is added, a new processing content may be additionally stored in the signal processing group storage unit 15 through the input device 12 or the communication device 14.

While common to the processing blocks, for example, in a case where a plurality of processing contents are registered in each process such that the processes 51 and 52 of a front-end processing S22 are handled as a series of processes, the plurality of processing contents may be handled as a series of processes. Further, after the feature extraction processing S5, the processing procedure may be set to proceed from right to left in FIG. 5 such that the pre-processing S4 is performed again.

The processing procedure and the diagnosis processing result obtained through the processes S2 to S6 are associated with each other, and stored in the processing procedure and diagnosis result storage database 17a (S7).

In practice, the diagnosis processing continues until an abnormality of the machine occurs in the operation environment, or the device is processed to intentionally cause an abnormality state so as to keep the diagnosis processing until the evaluation of the diagnosis result is performed. Then, if it is determined that the diagnosis result stored in the database is accumulated enough for the evaluation (S8), the diagnosis result is evaluated (S9). For example, the evaluation result values at normal and abnormal times are compared. The processing procedure having a largest difference or the processing procedure in which disturbance components such as noises are less is automatically or manually selected. In a case where the processing procedure is selected manually, the result of each processing procedure is displayed using the output device 13, and the designation such as selection may be realized by using the input device 12.

Figure 6:
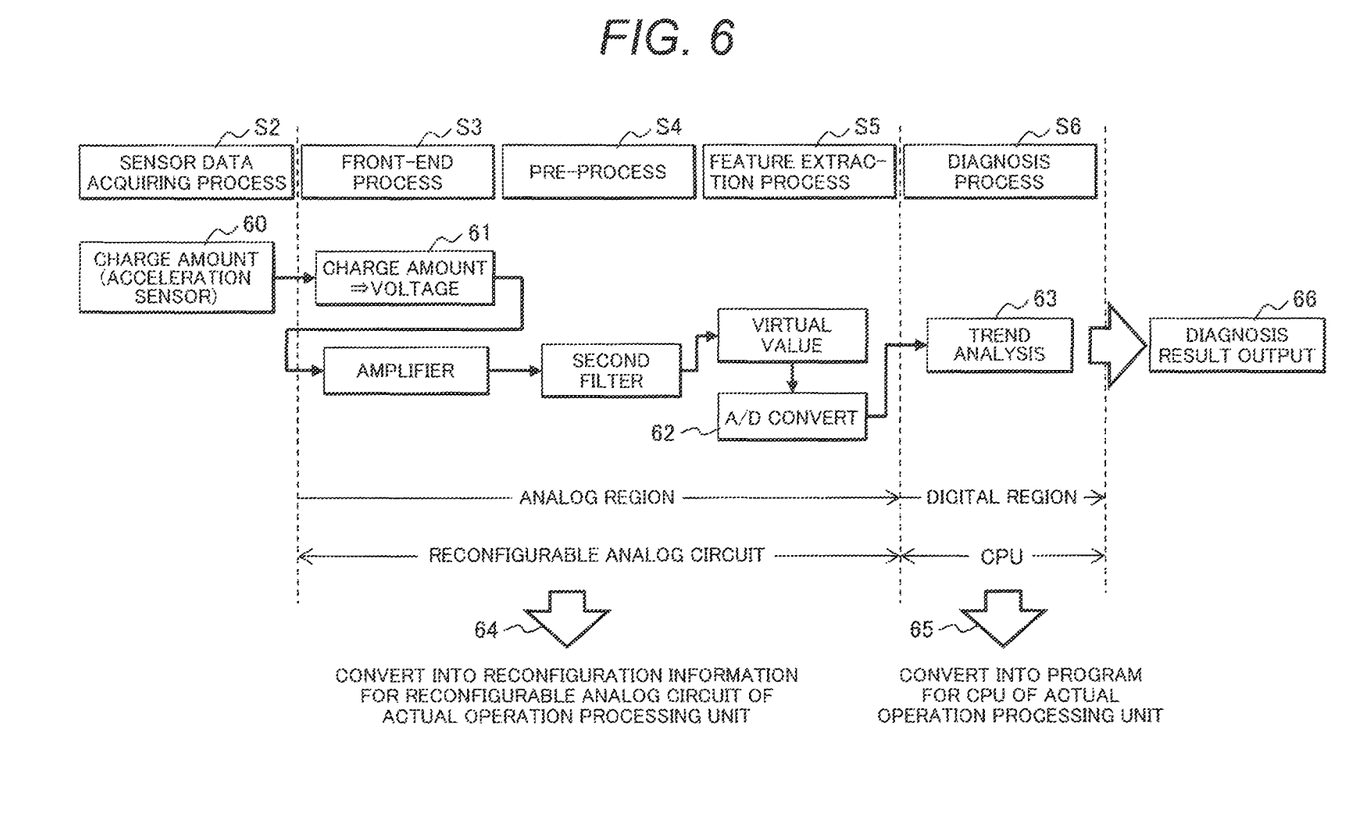
FIG. 6 is a diagram illustrating an example of an optimal diagnosis processing procedure which is selected from the diagnosis processing procedures of FIG. 5.

In the extraction process of an optimal processing procedure (S10), an optimal processing procedure is selected from the candidates of the diagnosis processing procedures of FIG. 5. An example of the optimal processing procedure is illustrated in FIG. 6. In the example, the front-end processing S3 to the feature extraction processing S5 are performed on the charge amount 60 which is an output of the acceleration sensor in the analog region, and the diagnosis processing procedure in which the diagnosis processing S6 is performed in the digital region is selected.

In a reconfiguration information creating process (S11), the selected optimal processing procedure is converted into the reconfiguration information for the reconfiguration on the actual operation diagnosis processing unit 2. In the example of FIG. 6, a process 61 to a process 62 are performed in the analog region. Therefore, these processes are converted into the reconfiguration information for the reconfigurable analog circuit 31 (64). On the other hand, a trend analysis process 63 is performed in the digital region, and thus the process is converted into a trend analysis algorithm for the programmable CPU 33. Further, the description herein is given about an example where the trend analysis is performed by the programmable CPU 33. However, the trend analysis may be performed by the reconfigurable digital circuit 32. In that case, the trend analysis process 63 is converted into the reconfiguration information for the reconfigurable digital circuit 32 (64).

Then, the reconfiguration information is output toward the actual operation diagnosis processing unit 2 (S12), and the process of the optimal diagnosis processing search unit 1 ends (S13).

Next, a process S14 to a process S25 in the actual operation diagnosis processing unit 2 will be described. As illustrated on the right side of FIG. 2, the actual operation diagnosis processing unit 2 performs the reconfiguration processing (S14 to S17) of the reconfigurable circuit and processing device 25 before the diagnosis processing (S18 to S25).

If the reconfiguration processing starts (S14), first, the reconfiguration information output by the optimal diagnosis processing search unit 1 is received (S15). Then, the reconfiguration of the reconfigurable analog circuit 31 and the reconfigurable digital circuit 32 and the change of the program of the programmable CPU 33 are performed on the basis of the reconfiguration information (S16). After these changes are reflected, the actual operation diagnosis processing unit 2 becomes a diagnosis device which performs the same processing procedure as the optimal processing procedure illustrated in FIG. 6 (S17). With this configuration, if the actual operation diagnosis processing unit 2 starts the diagnosis processing for an actual operation (S18), the processes S19 to S23 are performed with the optimal content as illustrated in FIG. 6, and the diagnosis result is output (S23).

According to the abnormality diagnosis system 100 of this embodiment described above, an optimal processing procedure searched by the optimal diagnosis processing search unit 1 in correspondence with a new sensor, the processing algorithm, and the diagnosis target can be simply reflected on the reconfigurable circuit and processing device 25 in the actual operation diagnosis processing unit 2. With this configuration, even in a case where the sensor or the processing algorithm is replaced, or a new machine is set as the diagnosis target, the actual operation diagnosis processing unit 2 can be reconfigured with speed. It is possible to handle an optimal processing procedure at a cheap price. In addition, in a case where a new diagnosis algorithm is developed, the priority to the algorithm used so far can be simply compared.

Further, in FIG. 1, it is assumed that one diagnosis target machine (the air compression device 3) is provided, and the abnormality diagnosis system 100 consisting of one optimal diagnosis processing search unit 1 and one actual operation diagnosis processing unit 2 are illustrated. However, in an environment where there are a plurality of similar diagnosis target machines, the abnormality diagnosis system 100 may be configured by one optimal diagnosis processing search unit 1 and a plurality of actual operation diagnosis processing units 2, an optimal process may be searched using one optimal diagnosis processing search unit 1, and the reconfiguration information corresponding to the diagnosis targets to the plurality of the actual operation diagnosis processing units 2 may be distributed. Further, in FIG. 1, the optimal diagnosis processing search unit 1 and the actual operation diagnosis processing unit 2 are prepared separately. However, these functions both may be combined in one device. First, an optical process may be determined by causing the device to function as the optimal diagnosis processing search unit 1, and then causing the device to function as the actual operation diagnosis processing unit 2.

Figure 2:
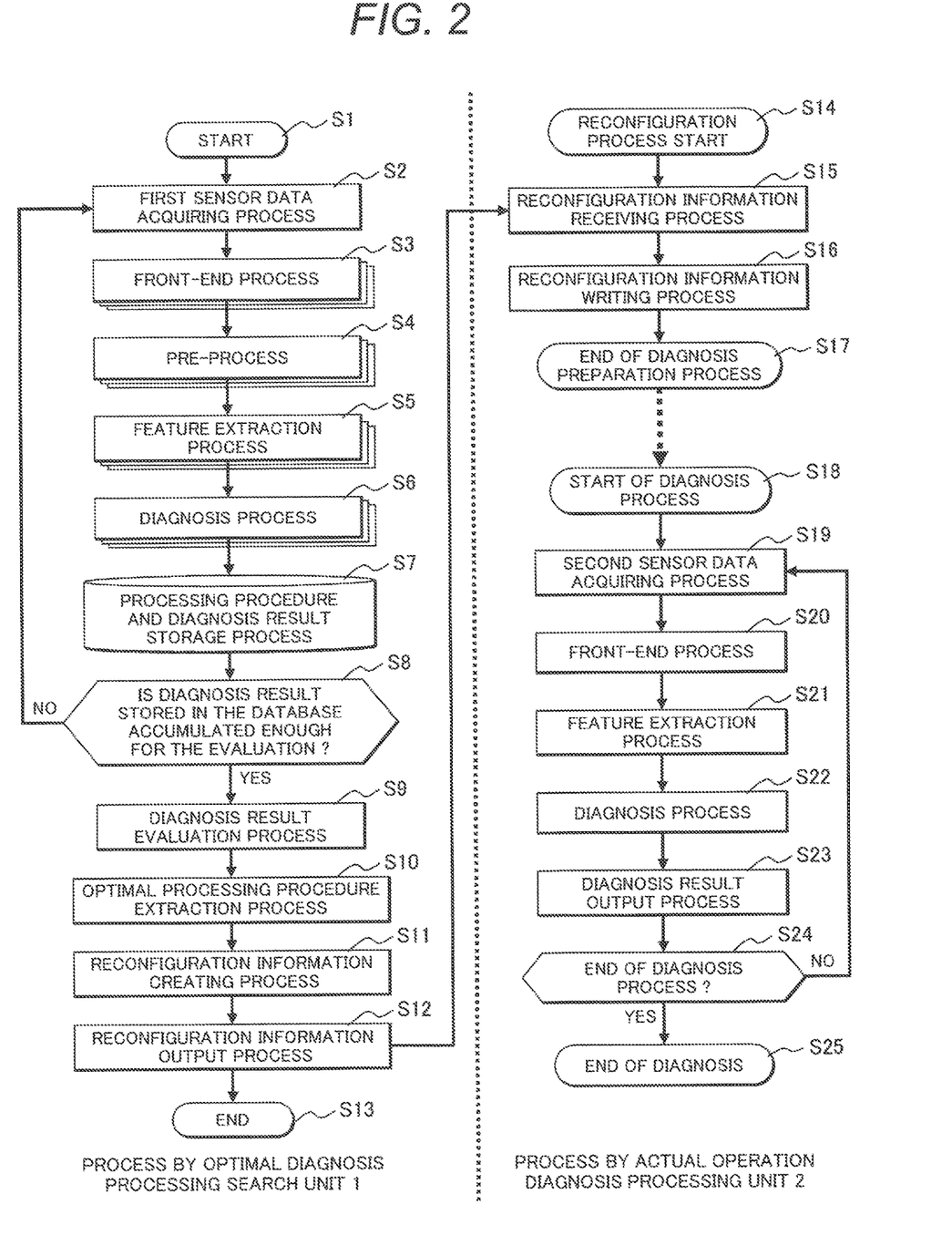
FIG. 2 is a flowchart of the abnormality diagnosis system of an embodiment.

In addition, in FIG. 2, the description has been given such that the front-end processing S3 to the diagnosis processing S6 are performed by one device. However, the processes of the front stage may be performed by a device provided near the diagnosis target machine, and the processes of the rear stage may be performed by a device on the network. For example, the processes up to the feature extraction processing S5 is performed by the optimal diagnosis processing search unit 1, the feature extraction data thus extracted is transferred to the storage and processing device 101 on the network through the communication path 102. The processes after the diagnosis processing S6 are performed on the network, and the reconfiguration information generated therein may be transmitted to the actual operation diagnosis processing unit 2.

REFERENCE SIGNS LIST

100 abnormality diagnosis system
101 storage and processing device on a network
102 communication path
1 optimal diagnosis processing search unit
11 central control device
12 input device
13 output device
14 communication device
15 signal processing group storage unit
15*a* front-end processing storage unit
15*b* pre-processing storage unit
15*c* feature extraction processing storage unit
15*d* diagnosis processing storage unit
16 signal processing execution unit
16*a* processing procedure control unit
16*b* front-end processing unit
16*c* pre-processing unit
16*d* feature extraction processing unit
16*e* diagnosis processing unit
16*f* diagnosis result evaluation unit
17 actual operation processing reconfiguration unit
17*a* processing procedure and diagnosis result storage database
17*b* reconfiguration information creation unit
2 actual operation diagnosis processing unit
21 central control device
22 input device
23 output device
24 communication device
25 reconfigurable circuit and processing device
26 device specification information database
3 air compression device
3*a* power source
3*b* rotary machine
3*c* air compressor main body
4*a*, 5*a* current sensor
4*b*, 4*c*, 5*b*, 5*c* acceleration sensor
6*a* first sensor data
6*b* second sensor data
30 sensor data
31 reconfigurable analog circuit
32 reconfigurable digital circuit
33 programmable CPU
34 diagnosis result

The invention claimed is:
1. An abnormality diagnosis system which detects a sign of failure of a diagnosis target machine, comprising:
   a plurality of first sensors disposed on target machine;
   a plurality of second sensors disposed on the target machine;
   a diagnosis processing search unit which receives first sensor information from the plurality of first sensors and extracts a feature value from the first sensor information, compares a plurality of diagnosis processing procedures to search for and automatically select an optimal diagnosis processing procedure, and outputs reconfiguration information corresponding to the optimal diagnosis processing procedure; and
   a diagnosis processing unit which includes a reconfigurable processing unit, which receives the reconfiguration information output from the diagnosis processing search unit, reconfigures a program to be executed by the processing unit based on the reconfiguration information, and the reconfigured processing unit executes a diagnosis process based on second sensor information from the plurality of second sensors to detect the sign of failure of the diagnosis target machine,
   wherein the plurality of first sensors are only connected to the diagnosis processing search unit among the diagnosis processing search unit and the diagnosis processing unit, and wherein the plurality of second sensors are only connected to the diagnosis processing unit among the diagnosis processing search unit and the diagnosis processing unit.

2. The abnormality diagnosis system according to claim 1, further comprising:
a specification information database which stores specification information of the diagnosis processing unit and specification information of the plurality of second sensors,
wherein the diagnosis processing search unit refers to the specification information database to search for the optimal diagnosis processing procedure.

3. The abnormality diagnosis system according to claim 1, wherein the diagnosis processing search unit and the diagnosis processing unit are independent devices and are connected by a communication path.

4. The abnormality diagnosis system according to claim 1, wherein a detection bandwidth and a measurement range of the plurality of first sensors is wider than a detection bandwidth and a measurement range of the plurality of second sensors.

\* \* \* \* \*